United States Patent
Kim et al.

(10) Patent No.: US 9,233,306 B2
(45) Date of Patent: Jan. 12, 2016

(54) METHOD AND APPARATUS FOR PROVIDING CHARACTER IN ONLINE GAME

(71) Applicant: INTELLECTUAL DISCOVERY CO., LTD., Seoul (KR)

(72) Inventors: Jeong Hun Kim, Seoul (KR); Ki Cheol Jang, Gyeonggi-do (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 13/988,096

(22) PCT Filed: Nov. 26, 2012

(86) PCT No.: PCT/KR2012/010018
§ 371 (c)(1),
(2) Date: May 17, 2013

(87) PCT Pub. No.: WO2013/100381
PCT Pub. Date: Jul. 4, 2013

(65) Prior Publication Data
US 2014/0309025 A1 Oct. 16, 2014

(30) Foreign Application Priority Data
Dec. 28, 2011 (KR) .................. 10-2011-0145288

(51) Int. Cl.
A63F 13/10 (2006.01)
A63F 13/30 (2014.01)
(Continued)

(52) U.S. Cl.
CPC .............. *A63F 13/12* (2013.01); *G06F 3/0481* (2013.01); *G06Q 50/01* (2013.01)

(58) Field of Classification Search
USPC ................................. 463/31, 32, 27
See application file for complete search history.

(56) References Cited

U.S. PATENT DOCUMENTS 8,851,978 B1 * 10/2014 Koh et al. .................. 463/25
2012/0295702 A1 * 11/2012 Otero et al. .................. 463/31
(Continued)

FOREIGN PATENT DOCUMENTS

JP 2006-087496 A 4/2006

OTHER PUBLICATIONS

International Preliminary Report on Patentability, Written Opinion and International Search Report issued in PCT Application No. PCT/KR2012/010018 on Jul. 1, 2014, along with English translation, 15 pages.
Guide on generation period of Legend character, Maple Story Homepage, [Online] Aug. 4, 2011, Retrieved from the Internet: http://maplestory.nexon.com/MapleStory/Page/Gnx.aspx? URL=News/ NoticeBoard&maskPageType=2&oidArticle=83399, 1 page.

(Continued)

*Primary Examiner* — Pierre E Elisca
(74) *Attorney, Agent, or Firm* — Rothwell, Figg, Ernst & Manbeck, P.C.

(57) ABSTRACT

A method for providing a character in an online game includes, by a character provision apparatus, selecting at least one season character from a plurality of general characters previously provided in a game according to a preset season character selection criteria, generating at least one season character pool according to a period for which the season character is selected, and storing the selected season character in a corresponding season character pool, judging whether a status point limit adjustment item is provided, setting a status point limit of the at least one season character differently according to the period such that the status point limit of the at least one season character is higher than a status point limit of each general character acquired using the status point limit adjustment item, and displaying, on a user terminal, that the at least one season character is added to the game.

16 Claims, 10 Drawing Sheets

(51) Int. Cl.
*G06Q 50/00* (2012.01)
*G06F 3/0481* (2013.01)

(56) References Cited

U.S. PATENT DOCUMENTS

2013/0217484 A1* 8/2013 Fujisawa et al. ............... 463/29
2014/0302900 A1* 10/2014 Lee et al. ...................... 463/4
2014/0357377 A1* 12/2014 Jung .............................. 463/42

OTHER PUBLICATIONS

FIFA online 2, Will legendary players disappear? Asked on company, Game Chosun, [Online] Oct. 28, 2011, Retrieved from the Internet: http://www.gamechosun.co.kr/article/view.php?no=82581, 2 pages.
Kartrider, Special pet addition, QMUD Cafe, [Online] Sep. 7, 2006, Retrieved from the Internet: http://www.qmud.com/v3.5/game_news_view.htm?no=11701, 2 pages.

* cited by examiner

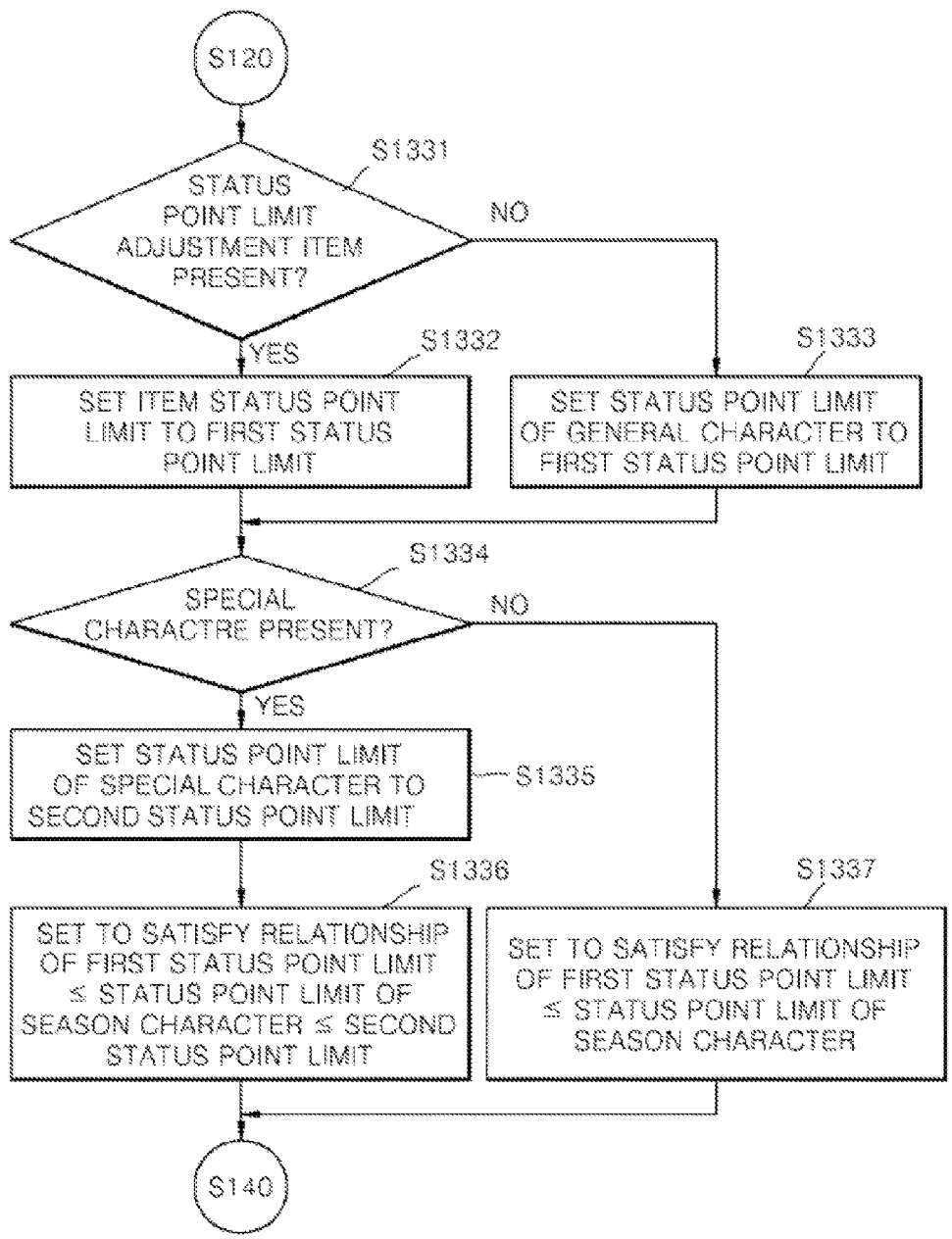

FIG. 7A

| CHARACTER INFORMATION | | | |
|---|---|---|---|
| CN — | CHARACTER NAME | | |
| CI — | CHARACTER IMAGE | BALL CONTROL | 98/100 | — SK1 |
| | | OFFENSE | 97/100 | — SK2 |
| | | PASS | 98/100 | — SK3 |
| | | DEFENSE | 99/100 | — SK4 |
| | | GOAL KEEPING | 100/100 | — SK5 |
| TSP — | TOTAL SKILL STATUS POINT | 492/500 | |
| ST — | EXPERIENCE POINT | 10 | |

FIG. 7B

| SEASON CHARACTER INFORMATION | | | |
|---|---|---|---|
| CN — | SEASON CHARACTER NAME | | |
| CI — | SEASON CHARACTER IMAGE | BALL CONTROL | 98/100 | — SK1 |
| | | OFFENSE | 97/103 | — SK2 |
| | | PASS | 98/100 | — SK3 |
| | | DEFENSE | 99/110 | — SK4 |
| | | GOAL KEEPING | 100/101 | — SK5 |
| TSP — | TOTAL SKILL STATUS POINT | 492/514 | |
| ST — | EXPERIENCE POINT | 10 | |

FIG. 9

| NOTICE |
|---|
| Two season characters were added.<br><br>Status point limits of the season characters are set higher than status point limits of general characters, and the status point limits and skill status points of the respective season characters are differently set.<br><br>In addition, even characters that are equal to each other are differently set in the status point limits and skill status points according to provision times thereof.<br><br>For example, even if a character provided in 2011 is equal to a season character provided in 2010, the status point limits and skill status points of the character provided in 2011 are set differently from those of the character provided in 2010.<br><br>Selecting a favorite season character is possible.<br><br>Two season characters are scheduled to be added.<br><br>OK |

METHOD AND APPARATUS FOR PROVIDING CHARACTER IN ONLINE GAME

CROSS REFERENCE TO RELATED APPLICATIONS AND CLAIM OF PRIORITY

This patent application is a National Phase application under 35 U.S.C. §371 of International Application No. PCT/KR2012/010018, filed Nov. 26, 2012, which claims priority to Korean Patent Application No. 10-2011-0145288 filed Dec. 28, 2011, entire contents of which are incorporated herein by reference.

BACKGROUND

1. Technical Field

The present invention relates to technologies with regard to an online game that manages characters, which achieve character differentiation through provision of a so-called season character, a status point limit of which is differently set according to when the character appears in a game, thereby allowing characters, which have conventionally been regarded in the same light because of the same status point limit thereof, to be utilized as different characters.

2. Background Art

In recent years, online games have become of great importance in online culture owing to advances in network and computer technologies. Development of online games arouses user demand for various genres of online games, and a wide variety of genres of online games are available at present.

Most current online games are character based. A user may access a game server using a user terminal, and enjoy an online game by selecting and manipulating game characters provided in online games. The characters provided in online games may be free of charge, or may be purchased in game using game points. Assuming that the user possesses a plurality of characters, the user may play a game while changing characters between turns. In an exemplary online game having a character provision function, the user possesses a team consisting of a plurality of characters, and manages the team by individually scouting, employing, or making a contract with each of the plurality of characters constituting the team.

In the case of a character that may be used in a game, although the character may be provided to a user regardless of restrictions on a usage period thereof, the usage period of the character may be limited according to the kind of games. Accordingly, if the usage period of the character expires, it may be necessary to pay character use costs via renewal and to extend the usage period of the corresponding character.

Some online games having a character provision function may provide a special character, which has different status points from those of a general character, in order to increase interest of the user in the games. The special character may be set to have higher status points than those of the general character, or to have special skills that are not given to other characters.

However, either of the general character or the special character has a status point limit that is basically set to a particular value, although skills or status points of the general character or the special character may vary according to the level of the character. Such a character, the status point limit of which is set to a fixed value, may be consequently regarded as having constant status points regardless of a current level of the character. That is, the characters finally have constant ability regardless of the level.

Accordingly, an online game service provider has a burden of developing and providing a novel character to a game, to assist the user who loss interest in existing characters in continuously enjoying games.

SUMMARY

Therefore, it is an object of the present invention to achieve differentiation of characters that have conventionally been regarded in the same light by differently setting a status point limit of each character according to when the character appears in a game, which may increase user interest in a game and reduce character development costs.

In accordance with one aspect of the present invention, the above and other objects can be accomplished by the provision of a method for providing a character in an online game, the character provision method including, by a character provision apparatus, selecting at least one season character from among a plurality of general characters previously provided in a game according to a preset season character selection criteria, generating at least one season character pool according to a period for which the season character is selected, and storing the selected season character in a corresponding season character pool, judging whether or not a status point limit adjustment item is provided, wherein the status point limit adjustment item functions to increase a status point limit, which is a preset upper limit of status points of the plurality of general characters in the game, by preset status points, setting a status point limit of the at least one season character differently according to the period for which the season character is selected such that the status point limit of the at least one season character is higher than a status point limit of each general character acquired using the status point limit adjustment item, and displaying, on a user terminal, that the at least one season character is added to the game.

The season character selection criteria may be set based on user preference with respect to each of the plurality of general characters for a preset period.

The season character selection criteria may be set based on a preset number of upper level characters among the plurality of general characters for a preset period.

If the online game reflects a real world match and the plurality of general characters reflects real world players, the season character selection criteria may be performance of the real players corresponding to the plurality of general characters for a preset period.

The storage of the season character in the season character pool may include setting the season character selection criteria, receiving an update request for information on the plurality of general characters, generating the season character pool, selecting the at least one season character from among the plurality of general characters according to the season character selection criteria, storing the selected season character in the season character pool, and updating information on the general characters.

The setting of the status point limit of the season character may include setting the status point limit of the general character to a first status point limit if the status point limit adjustment item is not provided, setting the status point limit of the general character acquired using the status point limit adjustment item to the first status point limit if the status point limit adjustment item is provided, and setting the status point limit of the at least one season character so as to be higher than the first status point limit.

The setting of the status point limit higher than the first status point limit may include, if the at least one season character includes a plurality of season characters, differently setting respective status point limits of the plurality of season characters.

The differently setting the respective status point limits of the plurality of season characters may include differently setting a plurality of status point limits of each of the plurality of season characters respectively.

The storage of the season character in the corresponding season character pool may include selecting a plurality of different season characters according to the period for which the season character is selected with respect to each of the plurality of general characters, and storing the plurality of season characters selected corresponding to one general character in different season character pools.

The display on the user terminal may include acquiring information on the at least one season character stored in the at least one season character pool, selecting an open season character, which will be open on the game, from among the at least one season character, displaying the open season character on the user terminal, and displaying, on the user terminal, the number of season characters except for the selected open season character among the at least one season character.

In accordance with another aspect of the present invention, there is provided a method for providing a character in an online game, the character provision method including, by a character provision apparatus, selecting at least one season character from among a plurality of general characters previously provided in a game according to a preset season character selection criteria, generating at least one season character pool according to a period for which the season character is selected, and storing the selected season character in a corresponding season character pool, setting a status point limit of the at least one season character differently according to the period for which the season character is selected such that the status point limit of the at least one season character is higher than a status point limit of each general character corresponding to a preset upper limit of the general character, and displaying, on a user terminal, that the at least one season character is added to the game.

In accordance with another aspect of the present invention, there is provided a method for providing a character of an online game, the character provision method including, by a character provision apparatus, selecting at least one season character from among a plurality of general characters previously provided in a game according to a preset season character selection criteria, generating at least one season character pool according to a period for which the season character is selected, and storing the selected season character in a corresponding season character pool, judging whether or not a special character is provided, the special character having a higher status point limit than the status point limit corresponding to the preset upper limit of the status points of the plurality of general characters in the game, and, if the special character is provided, setting the status point limit of the at least one season character differently according to the period for which the season character is selected such that the status point limit of the at least one season character is higher than a status point limit of each general character and lower than the status point limit of the special character, and displaying, on a user terminal, that the at least one season character is added to the game.

The setting of the at least one season character lower than the status point limit of the special character my include setting the status point limit of the general character to a first status point limit if the special character is not provided, setting the status point limit of the at least one season character so as to be equal to or greater than the first status point limit, setting the status point limit of the special character to a second status point limit if the special character is provided, and setting the status point limit of the at least one season character to a range between the first status point limit and the second status point limit.

In accordance with another aspect of the present invention, there is provided a method for providing a character of an online game, the character provision method including, by a character provision apparatus, selecting at least one season character from among a plurality of general characters previously provided in a game according to a preset season character selection criteria, generating at least one season character pool according to a period for which the season character is selected, and storing the selected season character in a corresponding season character pool, judging whether or not a status point limit adjustment item is provided, wherein the status point limit adjustment item functions to increase a status point limit, which is a preset upper limit of status points of the plurality of general characters in the game, by preset status points, judging whether or not a special character is provided, the special character having a higher status point limit than the status point limit of the plurality of general characters in the game, setting a status point limit of the at least one season character differently according to the period for which the season character is selected such that the status point limit of the at least one season character is higher than a status point limit of each general character acquired using the status point limit adjustment item and lower than the status point limit of the special character, and displaying, on a user terminal, that the at least one season character is added to the game.

The setting of the at least one season character lower than the status point limit of the special character my include setting the status point limit of the general character to a first status point limit if the status point limit adjustment item is not provided, setting the status point limit of the general character acquired using the status point limit adjustment item to the first status point limit if the status point limit adjustment item is provided, setting the status point limit of the at least one season character so as to be equal to or greater than the first status point limit if the special character is not provided, setting the status point limit of the special character to a second status point limit if the special character is provided, and setting the status point limit of the at least one season character to a range between the first status point limit and the second status point limit.

In accordance with a further aspect of the present invention, there is provided an apparatus for providing a character of an online game, the character provision apparatus including a character information storage unit that stores information on a plurality of general characters, a season character pool storage unit that selects at least one season character from among the plurality of general characters according to a preset season character selection criteria, generates at least one season character pool according to a period for which the season character is selected, stores the selected season character in a corresponding season character pool, and sets a status point limit corresponding to an upper limit of status points of the at least one season character differently according to the period for which the season character is selected, and an item information storage unit that stores information on a plurality of items.

The season character pool storage unit may set the status point limit of the season character so as to be higher than the status point limit of each general character.

Upon receiving information on a status point limit adjustment item that functions to increase the status point limit of the plurality of general characters by preset status points from the item information storage unit, the season character pool storage unit may set the status point limit of the season character so as to be higher than the status point limit of the general character acquired using the status point limit adjustment item.

Upon receiving information on a special character having a higher status point limit than those of the plurality of general characters from the character information storage unit, the season character pool storage unit may set the status point limit of the season character to a range between the status point limit of the general character acquired using the status point limit adjustment item and the status point limit of the special character.

Upon receiving information on the special character having a higher status point limit than those of the plurality of general characters from the character information storage unit, the season character pool storage unit may set the status point limit of the season character to a range between the status point limit of the general character and the status point limit of the special character.

If the online game reflects a real world match and the plurality of general characters reflects real world players, the season character pool storage unit may set performance of the real players corresponding to the plurality of general characters for a preset period to the season character selection criteria.

If the character information storage unit updates information on the general characters, the season character pool storage unit may select the season character using information on the general character before update.

The season character pool storage unit may differently set a plurality of status point limits of each of the plurality of season characters respectively.

The season character pool storage unit may store the plurality of season characters selected to correspond to one general character in different season character pools.

According to the present invention, through provision of a so-called season character, a status point limit of which is differently set according to when the character appears in a game, character differentiation may be accomplished to allow characters, which have conventionally been regarded in the same light because of the same status point limit thereof, to be utilized as different characters. Accordingly, in terms of a user, it is possible to utilize considerably various kinds of characters, which may increase user interest in a game. In addition, in terms of an online game service provider, it is possible to reduce character development costs owing to recycling of conventionally developed characters.

BRIEF DESCRIPTION OF DRAWINGS

FIG. 6 is a flowchart showing setting of a status point limit of a season character according to a further embodiment of the present invention.

FIGS. 7A and 7B are views showing a season character information screen according to an embodiment of the present invention.

FIG. 9 is a view showing a season character addition indicating screen according to an embodiment of the present invention.

DETAILED DESCRIPTION

Figure 1:
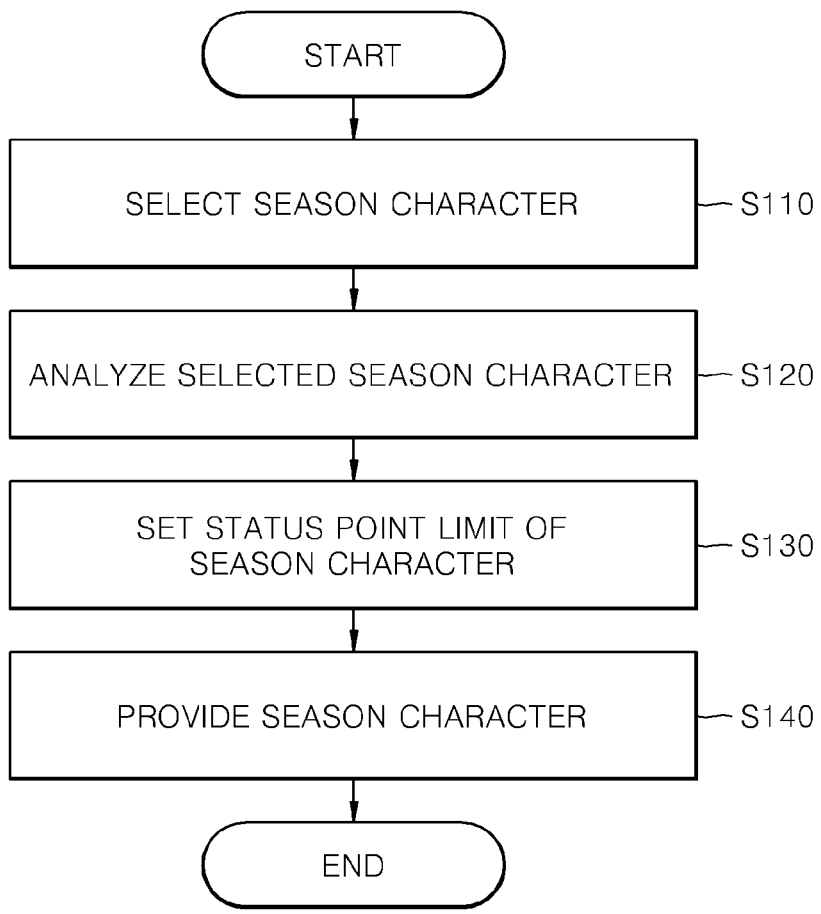
FIG. 1 is a flowchart of a method for providing a character in an online game according to an embodiment of the present invention.

Hereinafter, an apparatus and method for providing a character in an online game according to the embodiments of the present invention will be described with reference to the accompanying drawings.

Those skilled in the art will appreciate that the following embodiments are given to aid in understanding of the present invention and there is no intent to limit the technical sprit of the present invention. Accordingly, other equivalent inventions that perform the same functions as those of the present invention will be within the scope of the present invention.

With regard to add reference numerals to constituent elements shown in the respective drawings, it is noted that, wherever possible, the same or similar elements are denoted by the same reference numerals even though they are depicted in different drawings. In addition, in the following description of the present invention, a detailed description of known functions and configurations incorporated herein will be omitted when it may make the subject matter of the present invention rather unclear.

Additionally, with regard to describe constituent elements of the present invention, the terms first, second, A, B, (a), (b), etc. may be used. It will be understood that these terms are only used to distinguish the corresponding constituent elements from the other constituent elements, and essence, sequence, or the like of the corresponding constituent elements should not be limited by these terms. In the case in which some constituent elements are described as being "connected", "coupled", or "linked" to the other constituent elements, it should be understood that, although the corresponding constituent elements may be directly connected or coupled to the other constituent elements, additional constituent elements may be "connected", "coupled", or "linked" between the respective constituent elements.

In the embodiments of the present invention, the terms "communication", "communication network", and "network" may be used interchangeably. The three terms refer to as wired/wireless local area and wide area data transmission/reception networks to enable transmission/reception of files between user terminals and between a user terminal and a download server.

In the following description, the term "game server" refers to a server computer that a user accesses to use game content. In the case of a game, the capacity of which is small or the number of users of which is small, a single game server may manage a plurality of game programs. In addition, in the case of a game, the capacity of which is very great or the number of real time access users is great, one or more game servers may be present to manage a single game according to the function of the game.

Additionally, although database middleware or payment processing servers may be connected to a game server, a description thereof will be omitted in the present disclosure.

In the present invention, a character refers to all characters that appear in one kind of online game that allows the user to experience a particular sport. The character is displayed on a game screen and is adapted to perform predetermined actions within a range of a corresponding game according to user manipulation. In addition, the character may be raised in level by accumulating predetermined experience points according to game implementation results, and in turn status points of the character may be increased in proportion to the level of the character.

In the present invention, character's skills may be set in various ways according to characteristics of each game. In one example, assuming that an online game is an online fantasy game, kinds of character's skills may be set to magic, offense, and defense, for example. In another example, assuming that an online game is an online soccer game, kinds of player's skills, i.e. character's skills may be set to ball control, offense, pass/dribble, defense, and goal keeping, for example. The respective skills may be further subdivided according to setting conditions of a game. For example, with regard to offense among skills of an online fantasy game, detailed skills, such as power and accuracy, may be provided, and with regard to ball control of an online soccer game, detailed skills, such as endurance, stamina, composure, etc., may be provided. The user may convert experience points into respective skills at different rates, and thus grow an initial character having predetermined properties into different characters having different properties according to user selected conversion of the experience points into skill status points. That is, even if plural users play a game using the same character, properties of the character may be differentiated as the respective users convert experience points into various different kinds of skill status points, which results in growth of characters having different properties.

In the present invention, a status point limit refers to an upper limit of a character level, and the upper limit of the character level may be set to the sum of upper limits of respective status points of a plurality of skills. In most online games in which setting of the character level is possible, upper limits of status points of respective character's skills are set to maintain impartiality in progress of a game, and the sum of the upper limits may correspond to the sum of all status points of a character and may determine a status point limit.

In the present invention, sports refer to general sports including all sports that may be embodied in online games. For example, sports may include soccer, baseball, basketball, tennis, volleyball, track and field athletics, and martial arts.

In the present invention, the amount of money and costs required to use characters refers to cyber money or game points that may be used to purchase characters or items in online games, rather than referring to the amount of real money. Cyber money and game points may be acquired via implementation of a game, and as occasion demands may be acquired by selling items acquired during implementation of a game in a virtual game shop. In addition, according to games, cyber money may be acquired by paying real money. Although the amount of real money and the amount of cyber money may correspond to each other in a one to one ratio, they are generally set in different ratios. In addition, according to games, cyber money may be changed into game points of online games. That is, cyber money and game points may be interchanged, or change from cyber money to game points or vice versa may be possible.

FIG. 1 is a flowchart of a method for providing a character in an online game according to an embodiment of the present invention.

Referring to FIG. 1, the method for providing a character in an online game according to the present invention, first, includes selecting at least one season character (S110).

In the present invention, the season character refers to a character, a status point limit of which is differently set according to when the character appears in a game, i.e. according to a character provision time. As such, character differentiation is accomplished to allow characters, which have conventionally been regarded in the same light because of the same status point limit, to be utilized as different characters. By providing the season character with a status point limit differently set according to a provision time thereof, in terms of the user, it is possible to utilize a considerable number of different kinds of characters, which may enhance user interest in a game. In addition, in terms of an online game service provider, it is possible to reduce character development costs owing to recycling of standardized characters.

As described above, in the present invention, it is noted that the season character is not a novel character completely different from an existing character, and a status point limit of the season character is set differently from that of a general character or other season characters according to a provision time thereof.

Accordingly, the season character is selected from among a plurality of general characters of a conventional online game. The season character may be selected via a variety of methods. For example, the season character may be selected based on the performance of a general character in a game for a predetermined time period, or based on user preference. In addition, in the case in which an online game is an online sports game that reflects real world matches and real world players, the season character may be selected based on actual match performance of each player for a designated period of real world play.

After the at least one season character is selected, analysis of the selected season character is performed (S120). To differentiate the season character from a general character, first, it is necessary to analyze detailed character information regarding the selected season character. Here, the detailed character information regarding the selected season character is analyzed based on an online or offline object corresponding to the selected season character. Accordingly, if the season character is selected based on the performance of a general character in a game or based on user preference, the analyzed information regarding the season character may be acquired by analyzing information regarding the corresponding general character for a predetermined period. However, in the case of a game that reflects actual matches and actual players of a real world sports, information regarding the season character may be analyzed by analyzing actual match performance of each player for a designated period of real world play.

After analysis of the selected season character is completed, a status point limit of the season character is set based on the analyzed information regarding the season character (S130). In the present invention, the status point limit of the season character is basically set higher than a status point limit of a general character. If the status point limit of the season character is set equal to or less than the status point limit of the general character, there is substantially no difference between the season character and the general character, or the season character may fail to attract user interest. Thus, generation of the season character is meaningless. For this reason, the status point limit of the season character must be set higher than the status point limit of the general character.

After the status point limit of the season character is set, the season character is provided by a character provision apparatus (S140). In this case, the character provision apparatus gives a game a notification indicating generation of the season character to arouse user interest in the season character and to assist the user in utilizing the season character in a game. However, since the season character is acquired by recycling a general character, differently from a completely new character, it may be difficult to distinguish an outer appearance of the season character from that of the general character. Therefore, it is preferable that the character provision apparatus display characteristics of the season character (for example, an increased status point limit) in a manner that the user can easily perceive.

Consequently, according to the character provision method exemplarily shown in FIG. 1, at least one character among a plurality of general characters preset in a game is set to a season character, and a status point limit of the season character is set higher than a status point limit of the general character, so as to assist the user in utilizing the season character that is differentiated from the general character.

Figure 2:
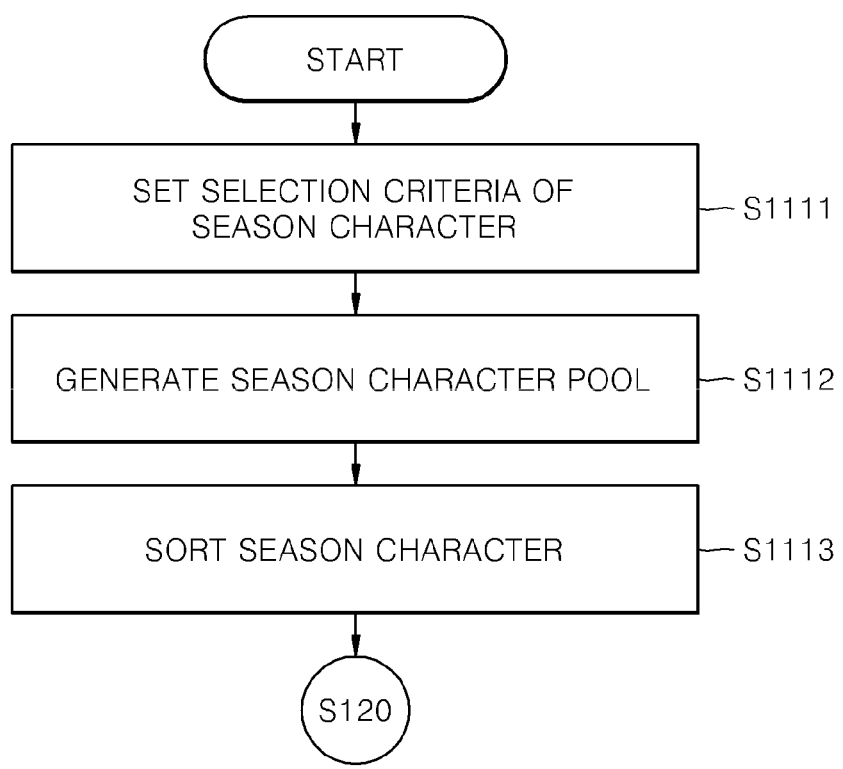
FIG. 2 is a flowchart showing selection of a season character according to an embodiment of the present invention.

FIG. 2 is a flowchart showing selection of the season character according to an embodiment of the present invention.

Explaining selection of the season character with reference to FIG. 2, first, selection criteria of the season character are set (S1111). The selection criteria of the season character may be set in various ways. In one example, a period to be analyzed may be set to the selection criteria of the season character. Since the season character is acquired by recycling an existing general character, accumulated information regarding the general character that will be selected as the season character is already present. In addition, in the case of a game that reflects real world matches and real world players, accumulated information regarding the corresponding real world players may be collected individually. Accordingly, when attempting to select the season character, it is necessary to first set an accumulation period for information to be analyzed, with regard to the accumulated information regarding the general character or the accumulated information regarding the real world players. In one example, the accumulation period may be set in the unit of one month. When analyzing the accumulated information regarding the general character of an online game, it is preferable to set the information accumulation period to one month because information regarding the general character may be frequently changed due to the nature of the online game and because a great amount of data is accumulated. On the contrary, the accumulated information regarding the real world player is preferably analyzed in the unit of one year because conventional sports operate on the basis of one season per year.

The selection criteria of the season character may include an analysis period and selection factors of the season character. In one example, the season character may be set based on user preference with respect to a general character that is selected as the season character of an online game for the analysis period, or based on the ranking of the general character in the game for the analysis period. In addition, an upper level character in the game may be set to the criteria of the season character.

Meanwhile, in the case of a game that reflects real world matches and real world players, performance of a corresponding player on a per season basis for the analysis period may be set to the selection criteria of the season character. In this case, the performance of the rear world player on a per season basis may be acquired using a performance estimation method of each real world sports match employed in an institute having public confidence. For example, in the case of an online soccer game, the best 11 for the season is elected. Although the best 11 for the season may be elected by several institutions, in one example, the best 11 elected by Federation International de Football Association (FIFA) may be set to the selection criteria of the season character.

After the selection criteria of the season character are set, at least one season character pool is generated (S1112). The season character pool refers to a storage space that stores season characters on a per analysis period basis. A status point limit of the season character varies according to a provision time thereof, and the provision time may be set to correspond to the analysis period. That is, season characters may be successively added on a per analysis period basis. Accordingly, season characters may be repeatedly generated and provided. In addition, a general character, which has once been selected as the season character, may again be selected as another season character. Therefore, it is necessary to sort and store season characters on a per provision time basis. In the present invention, to this end, at least one season character pool is generated, and season characters are sorted and stored in different season character pools according to a season character provision time, which enables efficient management of information regarding the season character.

After the season character pool is generated, one general character among a plurality of general characters, which is suitable for the selection criteria of the season character as set above, is selected as the season character (S1113). That is, the season character pool may be newly generated on a per season character analysis period basis, and season characters selected for the analysis period are stored in the generated season character pool.

Figure 3:
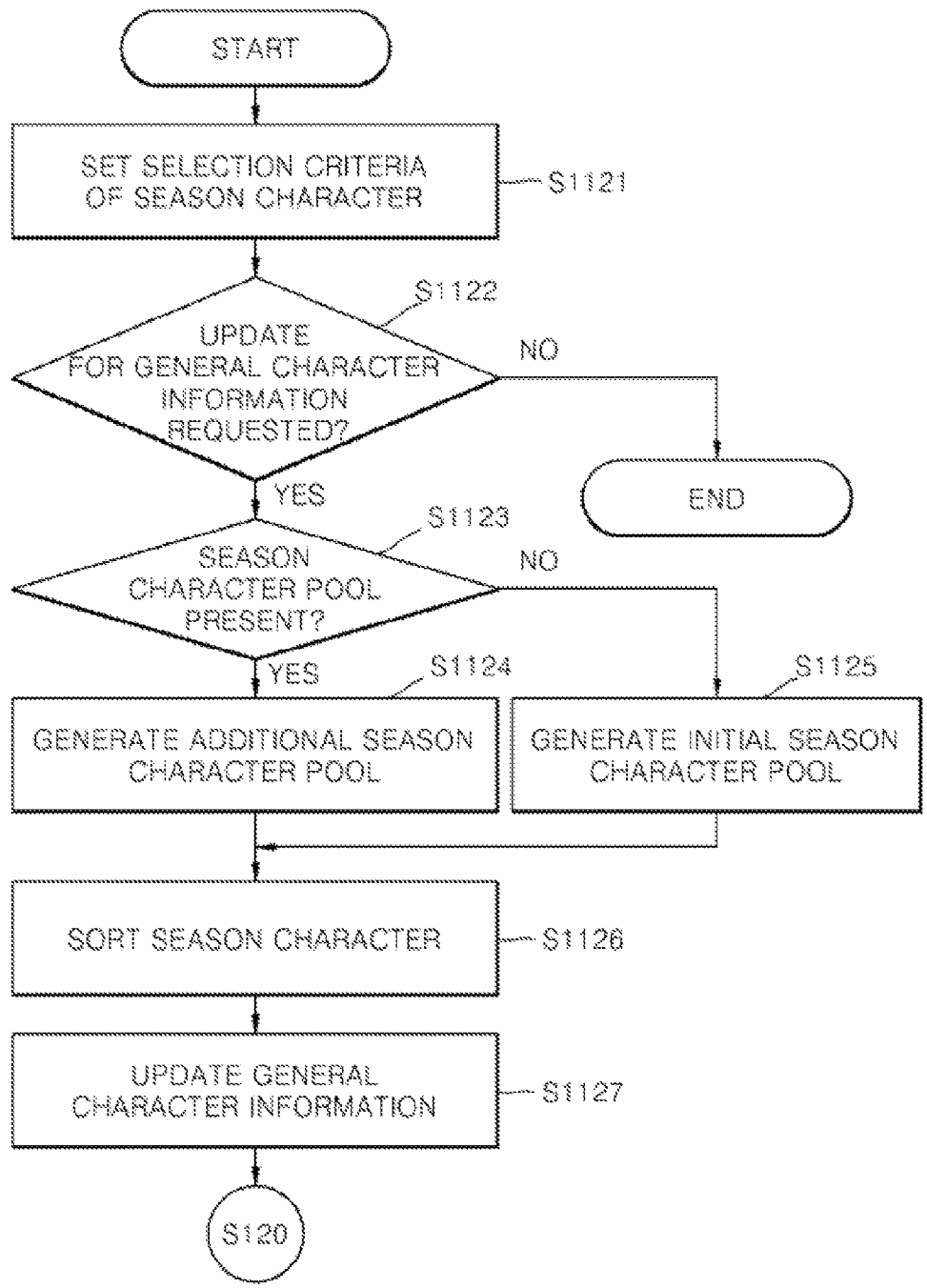
FIG. 3 is a flowchart showing selection of a season character according to another embodiment of the present invention.

FIG. 3 is a flowchart showing selection of the season character according to another embodiment of the present invention.

Selection of the season character, regardless of the general character, has been described above with reference to FIG. 2. However, in the case of some online games, periodic update of the general character is performed. In particular, a game that reflects real world matches and rear world players may periodically update the general character in order to reflect change in the performance of the real world players in the general character regardless of the season character. FIG. 3 shows the sequence of selecting the season character in an online game that periodically updates information regarding the general character.

Likewise, in FIG. 3, the selection criteria of the season character are set (S1121). A method for setting the selection criteria of the season character has been described above with reference to FIG. 2, and thus a description thereof will be omitted hereinafter.

After the selection criteria of the season character are set, it is judged whether or not an update request for information regarding the general character is received (S1122). If the update request for information regarding the general character is not received, the method ends without selection of the season character. However, if the update request for information regarding the general character is received, it is judged whether or not a previously generated season character pool is present (S1123).

If the previous season character pool is present, a new additional season character pool is generated (S1124). However, if the previous season character pool is not present, an initial season character pool is generated (S1125). Since season characters are newly successively generated and added on a per season character provision time basis as described above, it is necessary to individually generate and manage the season character on a per provision time basis. An initial season character pool is generated at the initial introduction stage of the season character, for which the season character pool is not preset. After the initial season character pool is generated, additional season character pools are successively generated.

Basically, although the initial season character pool and the additional season character pool may be set so as to have no difference in configurations thereof, as occasion demands, analysis periods of the initial season character pool and the additional season character pools may be differently set.

After the initial season character pool or the additional season character pool is generated, the season character is selected and stored in the generated season character pool (S1126). As such, the season character to be stored in the season character pool may be selected based on the previously stored information regarding the general character. As described above, it will be appreciated that an online game that periodically updates information regarding the general character reflects character information collected for a predetermined period, regardless of the case of updating information regarding the general character itself or the case of updating information regarding the general character in order to reflect performance of the corresponding real world player. Accordingly, previously stored information regarding the general character may be advantageously directly utilized for selection of the season character without requiring collection of information regarding the general character or the real world player. In addition, it is unnecessary to separately set an analysis period of the season character whenever information regarding the general character is updated periodically or non-periodically because a new season character pool may be generated and the season character may be selected before update of the information regarding the general character.

After the season character is selected and is stored in the season character pool, information regarding the season character stored in the season character pool is maintained, and information regarding the general character is updated (S1127).

Figure 4:
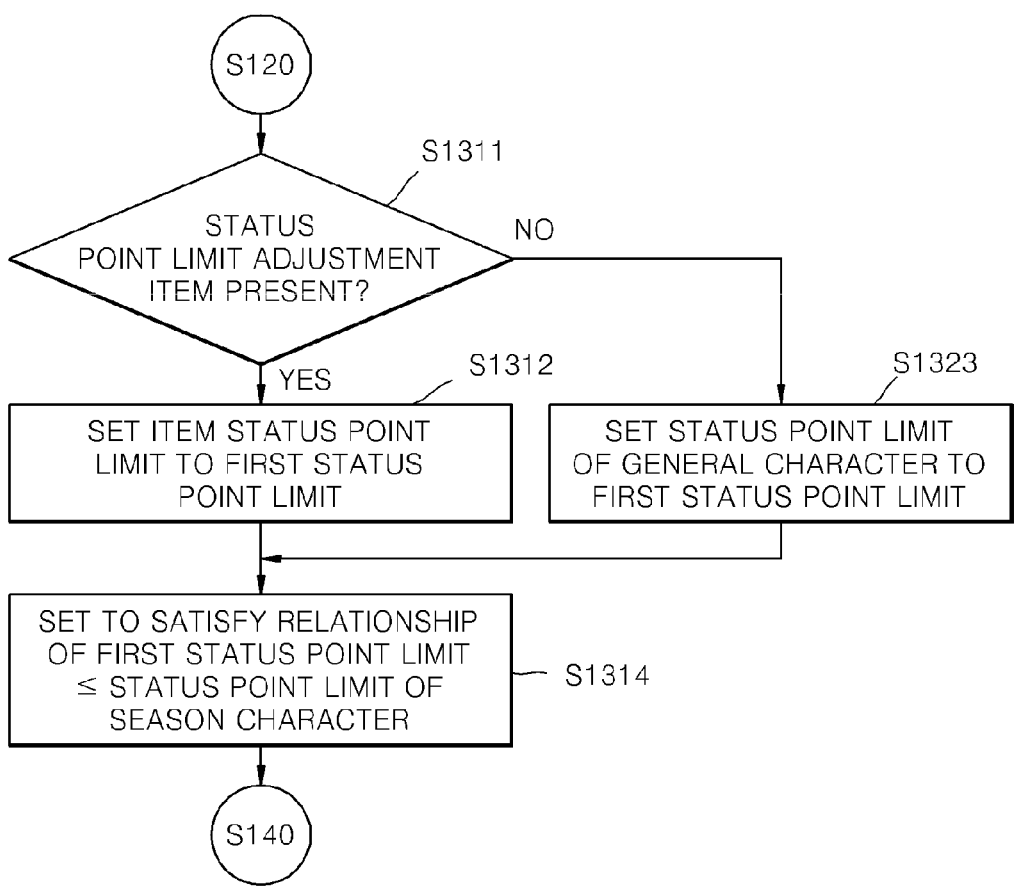
FIG. 4 is a flowchart showing setting of a status point limit of a season character according to an embodiment of the present invention.

FIG. 4 is a flowchart showing setting of the status point limit of the season character according to an embodiment of the present invention.

As described above, the status point limit of the season character is preferably set higher than the status point limit of the general character. However, the status point limit of the general character may vary. For example, for diversity of games, some online games may provide an item to adjust the status point limit of the character. In the case of using the status point limit adjustment item, the status point limit of the general character in a game may be set higher than a preset status point limit. As such, in an online game that provides a status point limit adjustment item, it is necessary to determine the order of priority with regard to the status point limit adjustment item when setting the status point limit of the season character. This is because separately generating the season character is meaningless even in the case in which the status point limit of the season character is equal to the status point limit of the general character under the use of the status point limit adjustment item.

In the sequence of setting the status point limit of the season character in FIG. 4, first, it is judged whether or not the status point limit adjustment item is present in a game (S1311). If it is judged that the status point limit adjustment item is present, a status point limit of the general character acquired using the status point limit adjustment item is set to a first status point limit (S1312). However, if the status point limit adjustment item is not present in the game, a preset status point limit of the general character is set to the first status point limit (S1313). Thereafter, the status point limit of the season character is set so as to be equal to or greater than the first status point limit (S1314). Here, the status point limit of the season character may be differently set on a per season character generation period basis and on a per season character basis as described above. Accordingly, setting the status point limit of the season character equal to or grater than the first status point limit refers to setting a minimum value of the status point limit of the season character so as to be equal to or greater than the first status point limit.

Consequently, in FIG. 4, in a game that provides the status point limit adjustment item, the status point limit of the season character is set so as to be equal to or greater than the status point limit of the general character acquired when using the status point limit adjustment item. In a game that provides no status point limit adjustment item, the status point limit of the season character is set so as to be equal to or greater than an originally set status point limit.

Figure 5:
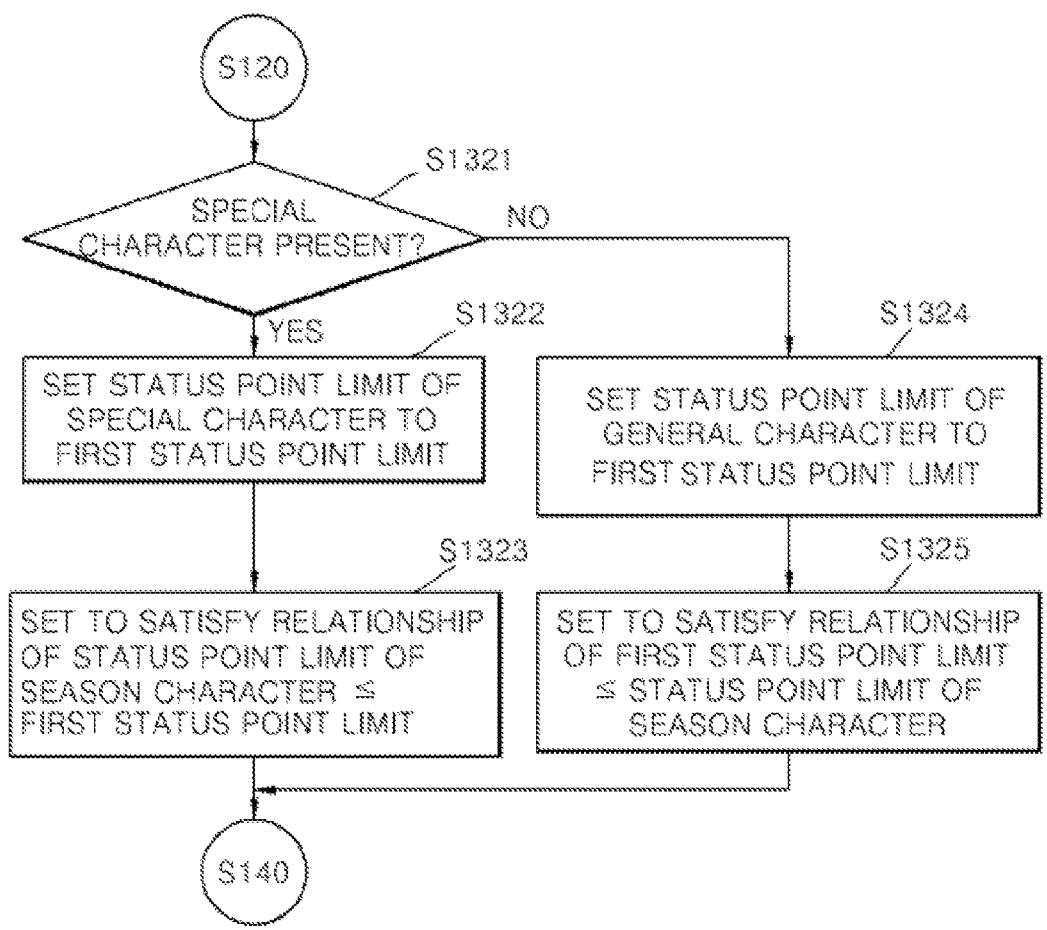
FIG. 5 is a flowchart showing setting of a status point limit of a season character according to another embodiment of the present invention.

FIG. 5 is a flowchart showing setting of the status point limit of the season character according to another embodiment of the present invention.

In addition to the status point limit adjustment item as described above with reference to FIG. 4, some online games may provide a special character having different status points or skills from those of the general character. Differently from the season character, the special character is a separately generated character, rather than one acquired by recycling a general character, and generally has a very high status point limit. In the case of the special character, only a small number is required to maintain balance of the entire game, differently from the general character. In addition, although a status point limit of the special character is set higher than that of the general character, the status point limit of the special character is not changed according to a special character provision time. That is, the special character is distinguished from the season character that is acquired by recycling the general character and is changed in status point limit according to a provision time thereof. Accordingly, relative adjustment of the status point limits between the season character and the special character is necessary.

In the sequence of setting the status point limit of the season character in FIG. 5, first, it is judged whether or not the special character is present in a game (S1321). If it is judged that the special character is present, the status point limit of the special character is set to a first status point limit (S1322). Then, the status point limit of the season character is set equal to or less than the first status point limit (S1323). That is, the status point limit of the season character is set equal to or less than the status point limit of the special character.

However, if the special character is not present in the game, a preset status point limit of the general character is set to the first status point limit (S1324). Thereafter, the status point limit of the season character is set equal to or greater than the first status point limit (S1325). That is, if the special character is not present, the status point limit of the season character is set equal to or greater than the status point limit of the general character.

FIG. 6 is a flowchart showing setting of the status point limit of the season character according to a further embodiment of the present invention.

FIG. 6 shows the sequence of setting the status point limit of the season character in consideration of the case in which both the status point limit adjustment item and the special character are present in an online game.

Similar to the above description of FIG. 4, first, it is judged whether or not the status point limit adjustment item is present in a game (S1331). If it is judged that the status point limit adjustment item is present, the status point limit of the general character acquired using the status point limit adjustment item is set to a first status point limit (S1332). However, if it is judged that no status point limit adjustment item is present in the game, a preset status point limit of the general character is set to the first status point limit (S1323).

Then, it is judged whether or not the special character is present (S1334). If it is judged that the special character is present, the status point limit of the special character is set to a second status point limit (S1335). Thereafter, the status point limit of the season character is set to a range of the first status point limit or more and the second status point limit or less (S1336). That is, the status point limit of the season character is set to a range from the status point limit of the general item to the status point limit of the special character, regardless of use of the status point limit adjustment item.

However, if the special character is not present in the game, the status point limit of the season character is set equal to or greater than the previously set first status point limit (S1337).

FIGS. 7A and 7B are showing a season character information screen according to an embodiment of the present invention.

FIG. 7A shows an information screen with respect to a conventional general character, and FIG. 7B shows an information screen with respect to a season character according to the present invention. In the following description, the character exemplarily shown in FIG. 7B is assumed to be a season character selected from among general characters exemplarily shown in FIG. 7A. That is, the season character of FIG. 7B, before setting a status point limit of the season character, is assumed to be equal to the general character of FIG. 7A.

The character information screen of FIGS. 7A and 7B may be displayed in the case of checking character information during progress of a game, or in the case of making a character contract. The user may check a character that the user possesses, or a character that the user wishes to possess by selecting a character information button or a game access screen during progress of a game.

The character information screens exemplarily shown in FIGS. 7A and 7B display a character name CN, a character image CI, skill status points SK1 to SK5, total skill status points on a per skill basis TSP, and experience points ST. Although the character name CN is designated to each character in a game, as occasion demands, the user may directly designate the character name.

The character image CI represents an outer appearance of the character displayed on a game screen, and is a pre-designated in most games. However, some recent games may allow the user to directly combine character images in various ways. Moreover, in the case in which a real world player is utilized as a character, the character may resemble an image of the real world player.

The skill status points on a per skill basis SK1 to SK5 numerically represent current maximum skill status points that may be set at a current level on a per skill basis (hereinafter referred to as level skill status points). The kinds of skills may be variously adjusted according to game setting conditions as described above. In the present invention, skills of an exemplary online soccer game are illustrated. The skill status points on a per skill basis exemplarily shown in FIGS. 7A and 7B are related to five kinds of skills, such as ball control, offense, pass, defense, and goal keeping, and represent skill status points of a player corresponding to a character of the online soccer game.

Considering the skill status points on a per skill basis with respect to the character with reference to FIG. 7A, status points with respect to a ball control skill of the character are 98, status points with respect to an offense skill of the character are 97, status points with respect to a pass skill of the character is 98, status points with respect to a defense skill of the character are 99, and status points with respect to a goal keeping skill of the character are 100. As such, it will be appreciated that the character displayed in FIG. 7A is a character, status points of most skills of which are close to upper limits at a current level.

In addition, considering level skill status points with respect to the character, all level skill status points on a per skill basis are set to 100. In the present invention, it is assumed that a limit of level skill status points, i.e. a level status point limit on a per skill basis is set to 100.

Hereinafter, the level skill status points will be described in detail. As described above, it will be appreciated that the skill status points in the game represent status points of a character, and that a character having higher skill status points basically has outstanding game play ability. However, if skill status points of a character, that a user is utilizing to play a game, exceed a value required at the level of the game that the user must perform at present, this means that the ability of the character exceeds the difficulty level of the game, which may cause the user to lose interest in the game. Therefore, in a great number of online games, the level of the character is set so as to be raised stepwise in proportion to the current difficulty level of the game, and level skill status points corresponding to each level are set. Accordingly, level skill status points corresponding to the level of the character are automatically set once the level of the character is determined, and the user is prevented from increasing the skill status points over the preset level skill status points before the level of the character is raised. That is, the level skill status points refer to a status point limit to which the user may increase skill status points of the character in proportion to the level of the character. In this case, the level skill status points are not set to a fixed value in proportion to the level of the character, and may be differently set in consideration of characteristics of the character. That is, in the case of a character that is good on offense, status points with respect to offense and pass skills are relatively high as exemplarily shown in FIG. 7A. On the other hand, in the case of the character that is good at defense, status points with respect to defense and goal keeping skills are relatively high. The character in FIG. 7A is a highest level character, a skill status point limit of which is set to 100 at every level.

The total skill status points (TSP) refer to the sum of skill status points on a per skill basis. In FIGS. 7A and 7B, the total skill status points as the sum of skill status points on a per skill basis is calculated by adding ball control skill status points of 98, offense skill status points of 97, pass/dribble skill status points of 98, defense skill status points of 99, and goal keeping skill status points of 100, and have a value of 98+97+98+99+100=492. Likewise, the total level skill status points as the sum of skill status point limits on a per level basis are calculated by 100*5=500. That is, the total level skill status points are the maximum skill status points that the character may reach at a current level. Accordingly, referring to the character information exemplarily shown in FIG. 7A, since the total skill status points of the character is 492 and the total level skill status points are 500, it will be appreciated that the displayed character has enough energy to increase skill status points by 500−492=8 at a current level.

The experience points ST are represented as 10. As described above, the experience points refer to points that may be converted into the skill status points by the user. The experience points may be converted into the status points with respect to each skill. Upon conversion of the experience points into the skill status points, a conversion ratio thereof is generally 1:1. Since the experience points are 10 in FIG. 7A, assuming that the experience points of 3 are converted into offense skill status points, the offense skill status points are increased by 3 to thereby reach 100, whereas the experience points are reduced by 3 to thereby reach 7. However, it is noted that changing the overall possessed experience points into offense skill status points is impossible because the level skill status points with respect to each character are preset. Referring to FIG. 7A, since the offense level skill status points are set to 100 and the current offense skill status points are 97, the maximum conversion limit that permits conversion of the experience points into the offense skill status points is 100−97=3.

Although not shown, "+" and "−" buttons may be added at one side of numbers representing the status points with respect to each skill to increase or reduce the skill status points. For example, if the user clicks the "+" button provided at one side of numbers representing the defense skill status points, the defense skill status points will be increased, but the experience points ST will be reduced proportionally. On the contrary, if the user clicks the "−" button, the defense skill status points will be reduced, but the experience points ST will be increased. In this case, it is noted that the skill status points, which will be reduced when the user clicks the corresponding button, cannot be smaller than original skill status points set upon initial display of the character information screen. That is, the "−" button functions only to reduce skill status points that have been increased from the skill status points currently displayed on the character information screen as the user clicks the "+" button. This serves to allow the user to concentrate his/her efforts on the growth of the character and to prevent the game from losing a balance due to excessively high degree of freedom.

Additionally, although not shown, the status points with respect to each skill may be set in such a way that subordinate skills are displayed when the user selects the corresponding skill, which may allow the user to set status points with respect to the subordinate skills.

Although the skill status points and the experience points may be set to real numbers, in most games, the points are set to positive integers, in order to ensure easier user comprehension. In the following description of the embodiments, for convenience of description, it is assumed that the points are set to positive integers.

Referring to FIG. 7A, the total level skill status points (status point limit) are 500, the total skill status points are 492, and the experience points are 10. In this case, the total skill status points must become 502 if the overall experience points are converted into the skill status points. However, since setting the total skill status points exceeding the total level skill status points is actually impossible, only the experience points of 8 are available even if the experience points are 10, and the total skill status points cannot exceed 500.

On the other hand, considering season character information exemplarily shown in FIG. 7B, skill status point limits with respect to offense, defense, and goal keeping skills are set to 103, 110, and 101 respectively, which exceed the skill status point limit of 100 that is given to the general character as exemplarily shown in FIG. 7A. That is, skill status point limits of the season character on a per skill basis may be adjusted according to a preset status point limit of the season character. The skill status point limits of the season character may be set on a per skill basis in various ways. Although the skill status point limits with respect to offense, defense, and goal keeping skills are increased with regard to the season character exemplarily shown in FIG. 7B, other season characters that are generated from a single general character based on different provision times thereof, or other season characters that are generated from different general characters based on the same provision time thereof may have raised skill status point limits with respect to a pass or ball control skill. In addition, although the total skill status points are set to 514 as exemplarily shown in FIG. 7B, the points may be differently set according to characters.

In the case of the season character exemplarily shown in FIG. 7B in which the status point limits thereof are higher than those of the general character, the overall experience points of 10 may be converted into the skill status points, which allows the season character to be distinguished from the general character regardless of a current level of the character.

Figure 8:
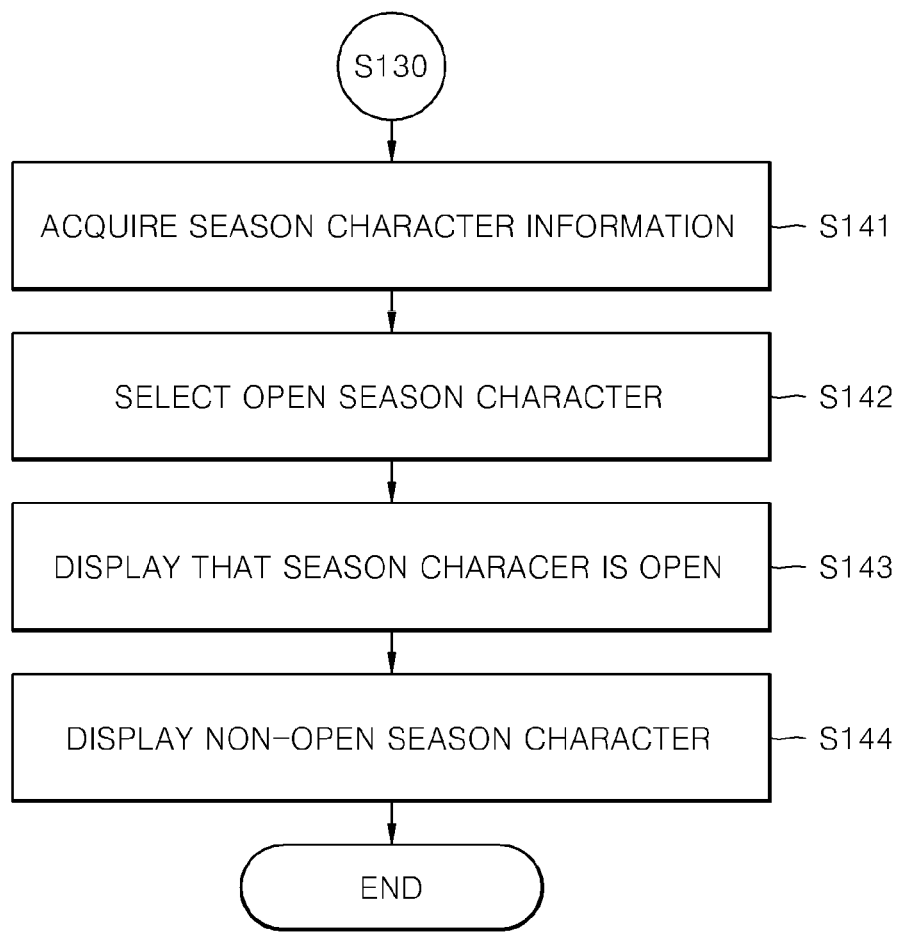
FIG. 8 is a flowchart showing provision of a season character according to an embodiment of the present invention.

FIG. 8 is a flowchart showing provision of the season character according to an embodiment of the present invention.

As described above with reference to FIG. 1, if the status point limit of the season character is set (S130), information regarding the season character is acquired (S141). The season character information is stored in at least one season character pool, and the at least one season character pool further stores information regarding other season characters that are generated based on different provision times thereof. The season character information acquired in FIG. 8 may refer to season character information included in the most recently generated season character pool. After the season character information is acquired, an open season character, which will be open to the user, will be selected from among one or more preset season characters (S142). Since the season character may be easily generated as compared to the general character or the special character, a greater number of season characters may be frequently added as compared to the general character or the special character. However, adding a great number of season characters at the same time may cause confusion when the user selects and utilizes the character. On the other hand, selecting the season character whenever a small number of season characters are required may also cause unnecessary load. Accordingly, in the present invention, the season character pool is employed. In FIG. 8, selecting the open season character serves to allow the user to select only some desired season characters from among a plurality of season characters stored in the season character pool, which assists the user to efficiently manage the characters. Then, that the season characters, which are selected to be open, are open the user is displayed on a screen during progress of the game (S143). That is, a notification indicating that a novel season character is added is sent to users to assist the users in utilizing the season character. In this case, it is preferable to display characteristics of the season character, in addition to the open season character. Users may have difficulty in perceiving a difference between the season character and the general character because the season character is basically acquired by recycling a selected one of general characters. Therefore, it is preferable to clearly display characteristics of the season character, i.e. differences between the season character and the general character, such as increased status point limits. Meanwhile, with regard to the other non-open season characters among the season characters stored in the season character pool, it is preferable to previously display that the non-open season characters are scheduled to be open later so as to arouse user interest (S144).

FIG. 9 is a view showing a season character addition indicating screen according to an embodiment of the present invention.

As described above with reference to FIG. 8, the season character addition indicating screen of FIG. 9 notifies addition of two season characters and displays characteristics of the season characters. In addition, the season character addition indicating screen of FIG. 9 displays the number of season characters to be added so as to arouse user interest. The season character addition indicating screen may be provided as a separate screen when the user selects a notification indicating addition of the season character from a notice screen or when it does not prevent game play, such as during game access. Alternatively, the season character addition indicating screen may be displayed on a game screen, such as a standby screen.

Figure 10:
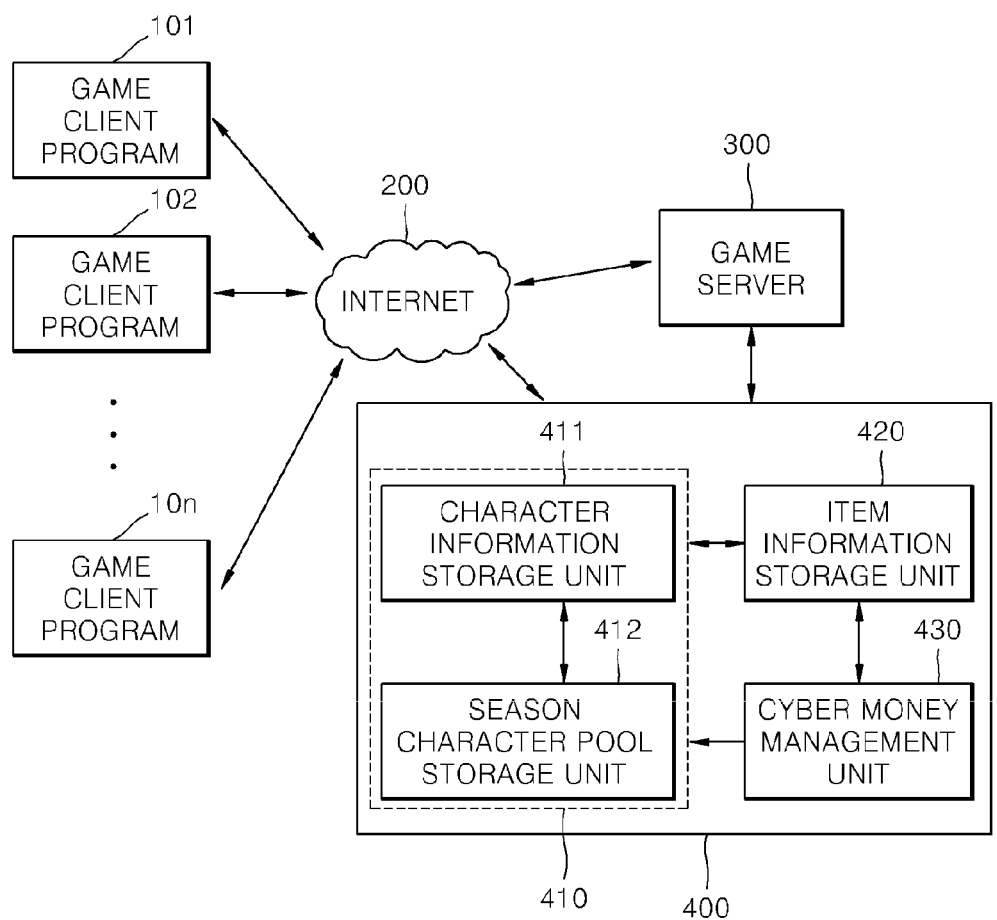
FIG. 10 is a block diagram of an apparatus for providing a character in an online game according to an embodiment of the present invention.

FIG. 10 is a block diagram of an apparatus for providing a character of an online game according to an embodiment of the present invention.

As exemplarily shown in FIG. 10, a system for providing a special character of an online game according to an embodiment of the present invention includes a plurality of user terminals 101 to 10n, Internet 200, a game server 300, and a character provision apparatus 400. Each of the plurality of user terminals 101 to 10n is connected to the game server 300 through the Internet 200, and is provided with a game client for implementation of a game.

The game server 300 provides a web page that the user can access, and also provides the user terminals 101 to 10n with several services, such as a variety of Internet games, chatting, society, shopping mall, etc. Although FIG. 10 illustrates a plurality of users as being connected to the game server 300 through the computers 101 to 10n, there may be other terminals that are connected to the game server 300 through the Internet 200 to perform a game. For example, mobile communication terminals, and Internet connectable televisions may be used.

In addition, in the present invention, the game server 300 provides a game entrance screen that allows the user to select game conditions.

If the user enters a game via a web page, the game server 300 drives game clients previously mounted in the user terminals 101 to 10n, and the user terminals 101 to 10n are connected to the game server 300 through the Internet 200 by the driven game clients. Here, although the game clients are assumed to be previously mounted in the user terminals 101 to 10n, the game server 300 may control installation of game clients for a corresponding game as necessary.

The game server 300 may include a game database (not shown) that stores game control logics on a per game basis. Here, game logics refer to specified rules to enable automated progress of a game according to a predefined rule, and may correspond to a series of game progress procedures.

The character provision apparatus 400 includes an information storage unit 410 in which character information as well as season character pools are stored, an item information storage unit 420 in which information on various items is stored, and a cyber money management unit 430 that manages cyber money or game points. The information storage unit 410 is divided into a character information storage unit 411 in which information on a plurality of general characters is stored, and a season character pool storage unit 412 in which at least one season character pool is stored. The character information storage unit 411 stores information on a special character if an online game provides the special character, in addition to information on the general characters. The season character pool storage unit 412 may store criteria for selection of a season character as well as at least one season character selected from the general characters stored in the character information storage unit based on the criteria for selection of the season character. In addition, the season character pool storage unit may generate an additional season character pool according to a period for selection and storage of the season character, and store the selected season character in the season character pool. That is, the season character pool storage unit 412 stores a plurality of season character pools, and stores the selected season character in one season character pool among the plurality of season character pools corresponding to a season character selection period.

The item information storage unit 420 may store information on a status point limit adjustment item if an online game provides the status point limit adjustment item, and allow some of characters stored in the character information storage unit 411 to possess the status point limit adjustment item. In the case in which the user wishes to purchase a general character or a special character stored in the character information storage unit 411, or a season character stored in the season character pool storage unit 412, or a character managed by the user wishes to purchase an item stored in the item information storage unit 420, the cyber money management unit 430 subtracts cyber money or game points possessed by the user or possessed by the character that is managed by the user by a rate corresponding to an object that the user or character wishes to purchase.

Although the information storage unit 410 and the item information storage unit 420 may store both character information and item information respectively, as occasion demands, the information may also be stored in the game server.

Although the character provision apparatus 400 is shown as a separate apparatus in FIG. 10, it may be included in the game server, and may take the form of a database as occasion demands.

The method and apparatus for providing a character in an online game according to the embodiments of the present invention as described above may be executed by an application that is originally equipped in a terminal (the application may include a program included in, for example, a basic platform or management system equipped in the terminal), or may be executed by an application (i.e. a program) that is installed, by a user, to the terminal through an application provider server, such as a web server associated with a corresponding service or application, or an application store server. In this regard, the method for providing a character in an online game according to the above described embodiments of the present invention may be realized by the application (i.e. the program) that is originally equipped in the terminal or the application that is installed to the terminal by the user, and the method may be recorded in a recording medium that may be read by a computer, for example, a terminal.

The above described functions may be executed as the aforementioned program is recorded in a computer readable recording medium and is executed by a computer.

As described above, to execute the method for providing a character in an online game according to the respective embodiments of the present invention, the aforementioned program may include computer code, such as a C, C++, or JAVA code, machine code, etc., that may be read by a computer processor, such as a Central Processing Unit (CPU).

The code may include function code associated with, for example, a function that defines the above described functions, and may also include control code associated with an execution procedure that assists the computer processor in executing the above described functions in a predetermined fashion.

In addition, the code may further include memory reference related code with respect to additional information required for the computer processor to execute the above described functions, or with respect to information on whether media will be referred to at any position (address) of an internal or external computer memory.

In addition, if the computer processor requires communication with any other remote computers, servers, or the like in order to execute the above described functions, the code may further include communication protocol related code that designates a communication method between the computer processor and any other remote computers, servers, or the like using a computer communication module (for example, a wired and/or wireless communication module) as well as information or media for transmission/reception during communication.

A functional program to realize the present invention, and code and code segments related to the program, for example, may be easily deduced or changed by programmers of the art of the present invention in consideration of, for example, a computer system environment for reading of a recording medium and execution of a program.

The computer readable recording medium, in which the above described program is recorded, may include a ROM, a RAM, a CD-ROM, a magnetic tape, a floppy disc, or an optical media storage device, for example.

In addition, the computer readable recording medium, in which the above described program is recorded, may be distributed in a computer system that is connected to the recording medium via a network, and may store and execute code that may be read in a distributed manner by the computer. In this case, at least one computer among a plurality of distributed computers may execute some of the above proposed functions, and may transmit the execution results to at least one of the other distributed computers. Likewise, the computers that receive the results may execute some of the above proposed functions, and may transmit the execution results to the other distributed computers.

In particular, the computer readable recording medium, in which an application, i.e. a program for execution of the method for providing a character in an online game according to the respective embodiments of the present invention may be a storage medium (for example, a hard disk) included in an application provider server, such as an application store server, a web server related to an application or a corresponding service, or the like, or may be an application provider server.

The computer, which can read the recording medium, in which the application, i.e. the program for execution of the method for providing a character in an online game according to the respective embodiments of the present invention, may include a general PC, such as a general desktop or laptop computer, a smart phone, a tablet PC, a Personal Digital Assistant (PDA), and a mobile terminal such as a mobile communication terminal, and moreover, may be construed as all possible computing devices.

In addition, if the computer, which can read the recording medium, in which the application, i.e. the program for execution of the method for providing a character in an online game according to the respective embodiments of the present invention, is a smart phone, a tablet PC, a PDA, or a mobile terminal, the application may be downloaded from the application provider server into the general PC, and may be installed in the mobile terminal via a synchronization program.

Although all the constituent elements of the embodiments of the present invention have been described as being combined into one or being operated in a combined state, the present invention is not essentially limited to the embodiments. That is, all the constituent elements may be selectively combined into and operated as at least one element within the scope of the present invention. In addition, although all the constituent elements may be realized respectively as independent hardware, some or all of the constituent elements may be selectively combined and be realized as a computer program having a program module that performs some functions or all functions of one piece of hardware or a plurality of pieces of hardware. The codes and code segments constituting the computer program may be easily deduced by those skilled in the art. The embodiments of the present invention may be realized as the computer program is stored in the computer readable medium that can be read by the computer and is read and executed by the computer. The storage medium for the computer program may include a magnetic recording medium, an optical recording medium, and the like.

In the above description, the terms "comprise," "constitutes" or "have" specify the presence of stated constituent elements so long as there is no particular description to the contrary, and therefore should be construed as further including other constituent elements, rather than excluding other constituent elements. All terms including technical or scientific terms, so long as they are not differently defined, have the same meaning as generally understood by those skilled in the art. The generally used terms, such as dictionary terms, should be construed as having the same meaning as the contextual meaning of the related art, and should not be construed as having ideal meaning or excessively formal meaning so long as they are not clearly defined in the present invention.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, the disclosed embodiments of the present invention are given only by way of explanation, rather than limiting the technical idea of the present invention, and the technical scope of the present invention is not limited by the embodiments. The protection range of the present invention should be construed by the following claims, and all technical ideas within the equivalent range thereof should be construed as being within the scope of the present invention.

The invention claimed is:

1. A method for providing a character in an online game, the character provision method comprising:

selecting, by a character provision apparatus, from a database, at least one season character from among a plurality of general characters previously provided in a game according to a preset season character selection criteria, electronically generating, by the character provision apparatus, at least one season character pool according to a period for which the season character is selected, and storing, by the character provision apparatus, the electronically generated selected season character in a corresponding season character pool, wherein the corresponding season character pool is stored in a computer storage device associated with the character provision apparatus;

judging, by the character provision apparatus, whether or not a status point limit adjustment item is provided, wherein the status point limit adjustment item functions to increase a status point limit, which is a preset upper limit of status points of the plurality of general characters in the game, by preset status points;

setting, by the character provision apparatus, a status point limit of the at least one season character differently according to the period for which the season character is selected such that the status point limit of the at least one season character is higher than a status point limit of each general character acquired using the status point limit adjustment item, and wherein electronically generating the selected season character with an adjusted status point limit results in the computer storage device using less computing resources rather than electronically generating general characters that do not have the adjusted status point limit; and displaying, on a user terminal, that the at least one season character is added to the game.

2. The method according to claim 1, wherein the storage of the season character in the season character pool includes:
setting the season character selection criteria;
receiving an update request for information on the plurality of general characters;
generating the season character pool;
selecting the at least one season character from among the plurality of general characters according to the season character selection criteria;
storing the at least one selected season character in the season character pool;
and updating information on the general characters.

3. The method according to claim 1, wherein the setting of the status point limit of the season character includes:
setting the status point limit of the general character to a first status point limit if the status point limit adjustment item is not provided;
setting the status point limit of the general character acquired using the status point limit adjustment item to the first status point limit if the status point limit adjustment item is provided; and
setting the status point limit of the at least one season character so as to be higher than the first status point limit.

4. The method according to claim 3, wherein the setting of the status point limit higher than the first status point limit includes, if the at least one season character includes a plurality of season characters, differently setting respective status point limits of the plurality of season characters.

5. The method according to claim 1, wherein the display on the user terminal includes:
acquiring information on the at least one season character stored in the at least one season character pool;
selecting an open season character, which will be open on the game, from among the at least one season character;
displaying the open season character on the user terminal; and
displaying, on the user terminal, the number of season characters except for the selected open season character among the at least one season character.

6. The method according to claim 1, wherein the judgment includes judging whether or not a special character is provided, the special character having a higher status point limit than the status point limit corresponding to the preset upper limit of the status points of the plurality of general characters in the game, and
the setting of the status point limit includes, if the special character is provided, setting the status point limit of the at least one season character differently according to the period for which the season character is selected such that the status point limit of the at least one season character is higher than a status point limit of each general character and lower than the status point limit of the special character.

7. The method according to claim 6, wherein setting of the status point limit includes:
setting the status point limit of the general character to a first status point limit if the special character is not provided;
setting the status point limit of the at least one season character so as to be equal to or greater than the first status point limit;
setting the status point limit of the special character to a second status point limit if the special character is provided; and
setting the status point limit of the at least one season character to a range between the first status point limit and the second status point limit.

8. An apparatus for providing a character in an online game, the character provision apparatus comprising a memory, a processor coupled to the memory, wherein the processor includes:
a character information storage unit that stores information on a plurality of general characters;
a season character pool storage unit that selects at least one season character from among the plurality of general characters according to a preset season character selection criteria, electronically generates at least one season character pool according to a period for which the season character is selected, stores the selected season character in a corresponding season character pool, and electronically sets a status point limit corresponding to an upper limit of status points of the at least one season character differently according to the period for which the season character is selected; and an item information storage unit that stores information on a plurality of items, and wherein electronically generating the selected season character with an adjusted status point limit results in the computer storage device using less computing resources rather than electronically generating general characters that do not have the adjusted status point limit.

9. The apparatus according to claim 8, wherein the season character pool storage unit sets the status point limit of the season character so as to be higher than the status point limit of each general character.

10. The apparatus according to claim 8, wherein, upon receiving information on the status point limit adjustment item that functions to increase the status point limit of the plurality of general characters by preset status points from the item information storage unit, the season character pool storage unit sets the status point limit of the season character so as to be higher than the status point limit of the general character acquired using the status point limit adjustment item.

11. The apparatus according to claim 10, wherein, upon receiving information on a special character having a higher status point limit than those of the plurality of general characters from the character information storage unit, the season character pool storage unit sets the status point limit of the season character to a range between the status point limit of the general character acquired using the status point limit adjustment item and the status point limit of the special character.

12. The apparatus according to claim 8, wherein, upon receiving information on the special character having a higher status point limit than those of the plurality of general characters from the character information storage unit, the season character pool storage unit sets the status point limit of the season character to a range between the status point limit of the general character and the status point limit of the special character.

13. The apparatus according to claim 8, wherein, if the online game reflects a real world match and the plurality of general characters reflects real world players, the season character pool storage unit sets performance of the real players corresponding to the plurality of general characters for a preset period to the season character selection criteria.

14. The apparatus according to claim 8, wherein, if the character information storage unit updates information on the general characters, the season character pool storage unit selects the season character using information on the general character before update.

15. A non-transitory computer readable recording medium in which a program for realizing a method for providing a character of an online game is recorded, the character provision method comprising:

selecting, by a character provision apparatus, at least one season character from among a plurality of general characters previously provided in a game according to a preset season character selection criteria, electronically generating, by the character provision apparatus, at least one season character pool according to a period for which the season character is selected, and storing, by the character provision apparatus, the electronically generated selected season character in a corresponding season character pool;

judging, by the character provision apparatus, whether or not a status point limit adjustment item is provided, wherein the status point limit adjustment item functions to increase a status point limit, which is a preset upper limit of status points of the plurality of electronically generated general characters in the game, by preset status points;

setting, by the character provision apparatus, a status point limit of the at least one season character differently according to the period for which the season character is selected such that the status point limit of the at least one season character is higher than a status point limit of each general character acquired using the status point limit adjustment item, and wherein electronically generating the selected season character with an adjusted status point limit results in the computer storage device using less computing resources rather than electronically generating general characters that do not have the adjusted status point limit; and displaying, on a user terminal, that the at least one season character is added to the game.

16. The computer readable recording medium of claim 15, selected from the group consisting of a ROM, a RAM, a CD-ROM, a magnetic tape, a floppy disc, and an optical media storage device.

* * * * *